May 30, 1967     M. BLANDER ET AL     3,321,957

LEAK DETECTION APPARATUS

Filed Jan. 28, 1965

INVENTORS
MILTON BLANDER
BY WILLIAM V. JOHNSTON

ATTORNEY

United States Patent Office 3,321,957
Patented May 30, 1967

3,321,957
LEAK DETECTION APPARATUS
Milton Blander, Thousand Oaks, and William V. Johnston, Camarillo, Calif., assignors to North American Aviation, Inc.
Filed Jan. 28, 1965, Ser. No. 428,709
5 Claims. (Cl. 73—40.5)

ABSTRACT OF THE DISCLOSURE

This disclosure relates to an apparatus for detecting leaks utilizing a thermistor which is cooled directly by a stream of gas forming the leak from a vessel or pipe. This cooling will result in a change in electrical resistance which is compared in a bridge network to a similar thermistor which is exposed only to ambient conditions and not to the leak stream. In this manner the detection of a leak is not dependent upon the conductivity of the gas.

---

The present invention relates to leak detectors and more particularly to gas flow detectors utilizing highly temperature-sensitive elements.

The detection and location of minute leaks in pressurized vessels or systems requires simple and reliable leak detecting apparatus. Prior art devices of this type generally utilize audible and ultrasonic sound, pressure vibration, or require the use of special fluids to be detected. The present invention is directed to a highly sensitive portable electronic device useful for the detection of leaks from pressurized containers wherein any gas, including air, may be detected and which does not require the use of two fluids of known thermal conductivity.

Therefore, it is an object of the present invention to provide a highly sensitive portable electronic leak detector which does not require a unique reference fluid, and which is essentially independent of the thermal conductivity of the gas.

It is a further object of the present invention to provide a leak detecting apparatus capable of accurately detecting and locating fluid leaks with high sensitivity and which is inexpensive to fabricate and simple to use.

It is another object of the present invention to provide apparatus for detecting leaks in a pressurized container utilizing temperature sensitive elements monitoring ambient conditions and comparing such conditions with the environment adjacent to the leak.

These and other objects of the present invention will become more apparent from the following detailed description of various embodiments of the present invention taken together with the drawings, hereby made a part thereof, in which.

Figure 1:
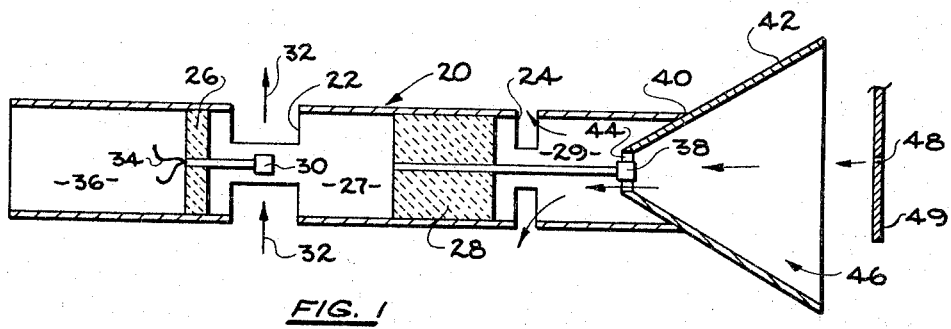
FIG. 1 is a sectioned schematic view of the apparatus of the present invention.

Referring now to the drawings in detail, the apparatus of the present invention comprises a tubular housing 20 having a pair of transverse apertures 22 and 24 at spaced locations along its length. A first wall member 26 seals the housing 20 on one side of aperture 22 and a second wall member 28 seals the housing 20 at a point between the apertures 22 and 24. Wall member 26 supports a thermistor 30 in such a position as to expose the thermistor 30 to the ambient air flow, indicated by arrows 32, passing through aperture 22. An appropriate opening is provided in wall member 26 for the passage of wires 34 of thermistor 30 into the region 36.

The wall member 28 supports a second thermistor 38 in a position spaced from the aperture 24 and from the end 40 of housing 20. A cone-shaped element 42, or other baffle, is attached to the end 40 of housing 20 and has its truncated apex 44 positioned to surround the thermistor 38. In this manner any gas flow from a leak, represented at 48, in a vessel wall 49 adjacent the base opening 46 of baffle 42, is directed across the thermistor 38 into the interior of the housing 20 and out through the aperture 24. The flow of gas across thermistor 38 cools it and because of this characteristic a difference in the electrical resistance exists between thermistors 30 and 38. The wall members 26 and 28 are preferably fabricated of thermal insulating material so that the two chambers 27 and 29 are physically and thermally isolated from each other. The thermistor 30 is supported in any well-known manner in a position such that it is essentially completely exposed to the immediate atmospheric environment of chamber 27, while thermistor 38 is supported in any desired manner within opening 44. In this manner any gas flow through chamber 29 from a leak 48 will cool thermistor 38 thereby indicating a leak 48 is adjacent the opening 46. To minimize the effects of ambient air currents on the flow of gas in volume 29, aperture 24 may be made small compared to aperture 22 or appropriate baffles may be employed to direct ambient air movement through aperture 24 away from thermistor 38.

Figure 2:
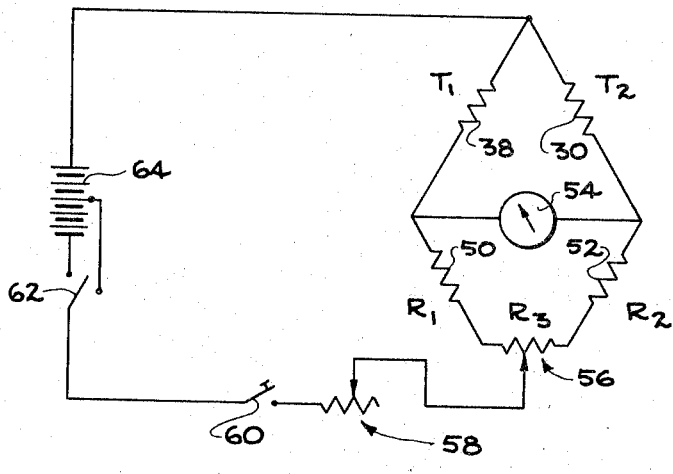
FIG. 2 is a circuit diagram of the electrical components utilized with the apparatus of FIG. 1.

The circuit of FIG. 2 is used to detect and measure the above described resistance difference. A standard bridge type circuit is utilized having thermistors 30 and 38 (500 ohms, e.g., type 1D12) in adjacent arms and fixed resistors 50 and 52 (1.5 K.) in the other adjacent pair of arms with the connecting points of each of these two pairs interconnected through a microameter 54. Fixed resistors 50 and 52 are also connected to opposite ends of a variable resistor 58. $T_1$ and $T_2$ are placed in the probe of FIG. 1, so that $T_1$, 38 is in the stream of leaking gas and $T_2$, 30 is shielded from the stream, but is near $T_1$ and is otherwise in the same configuration as $T_1$ but exposed only to ambient conditions. In this manner partial compensation for local temperature fluctuations is attained. The thermistors 30, $T_2$ and 38, $T_1$ are preferably as small as possible and should have a time constant of 0.5 second or less for best results.

The movable contact of balancing potentiometer 56 is connected through variable resistor 58, which functions as a sensitivity adjustment, switch 60, to the movable contact of double position switch 62. The two contacts of switch 62 are connected to battery 64 in order to provide either 22.5 v. or 45 v. across the bridge circuit.

As the gas stream from leak 48 impinges upon thermistor 38 through which a current is passing, convective cooling of the thermistor 38 by the flow of gas will occur. Further, the expansion of gas through leak 48 will lead to adiabatic cooling of the gas which will also cool the thermistor 38. The cooling results in a change in electrical resistance which is indicated by a deflection in the meter 54.

The thermistor 30 which is exposed only to ambient atmospheric conditions introduces a resistance into the bridge circuit which is independent of conditions affecting thermistor 38. The meter deflection indicates the difference in resistance of the two thermistors 30 and 38 and is a function of the size of the leak and pressure differential on opposite sides of the wall 49.

Figure 3:
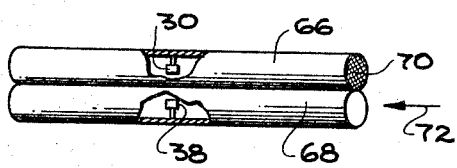
FIG. 3 is a partially sectioned perspective view of a second embodiment of the present invention.

FIG. 3 shows in schematic form another arrangement of the thermistors 30 and 38 and utilizes the circuit of FIG. 2 or its equivalent. In this modification the housing comprises a pair of tubular members 66 and 68 forming individual chambers supported in adjacent parallel relation, as by welding, with one thermistor 30 supported in a central position in member 66 and one thermistor 38 supported in the other member 68. One end of one member 66 is preferably closed by plug 70 which is made of thermal insulating material. In this manner gas flow, indicated by arrow 72, from a leak flows through tube 68 and cools thermistor 38 in a manner similar to the device of FIG. 1. Apertures may be provided in the wall of member 66, if desired, to provide a means for exposing the thermistor 30 to ambient air conditions.

The response of the above-described device to standard sized leaks at various pressures showed that 1 mil holes with pressure differentials of as small as 1 p.s.i. could be detected if the open end of the device was placed within about 1 inch of the test leak. Increased pressure on the gas source permitted detection of small leaks at increased distances, e.g., 1 mil leak with 6 p.s.i. pressure in the gas source permitted detection when the probe was at a 3-inch distance from the leak.

It is apparent from the above description that the present invention provides apparatus utilizing resistance elements having a high negative temperature coefficient of electrical resistance in a probe which has extreme sensitivity to small leaks. Further, since the probe of the present invention is responsive to gas flow, i.e., convective cooling and adiabatic cooling of the leaking gas, no auxiliary pumping apparatus is required.

The present invention is not limited to the specific details of the particular embodiments described, since many modifications will be apparent to those skilled in the art, the scope of the present invention being limited only by the appended claims.

We claim:

1. A leak detector comprising a housing having first and second isolated chambers, one end of one of said chambers being adapted to allow a gas to enter said one chamber, means for directing said gas out of said one chamber at a point remote from said one end, means for preventing said gas from directly entering said other chamber, resistance means disposed in each of said chambers and having the characteristics of a high negative temperature coefficient of electrical resistance, means for exposing said resistance means in said one chamber to said entering gas, means for exposing said resistance means in said other chamber to ambient conditions, means electrically connected to each of said resistance means for comparing the electrical resistivity of said resistance means and indicating the difference in resistance.

2. The leak detector of claim 1 wherein said electrical means includes a bridge circuit, and including means on said one end of said one chamber for directing gas into said chamber.

3. The leak detector of claim 1 wherein said housing comprises a tube and said chambers are longitudinally spaced within said housing.

4. A leak detector comprising a tubular housing, means in said housing for forming a pair of longitudinally isolated chambers within said housing, apertures in said housing communicating with each of said chambers, one end of said housing being adapted to direct a gas into one chamber, resistance means disposed in each of said chambers and having the characteristics of a high negative temperature coefficient of electrical resistance, said resistance means in said one chamber being positioned within said housing so that it is remote with respect to said apertures and is directly exposed to any gas flow through said one end, said resistance means in said other chamber being positioned adjacent said apertures so that it is directly exposed to ambient conditions, means including an electrical bridge circuit for comparing the electrical resistivity of said resistance means, and indicating the difference in resistance resulting from gas flow in said one chamber.

5. A leak detector comprising a housing having a pair of tubes in adjacent parallel relation thereby forming first and second isolated chambers, one of said chambers being adapted to allow a gas to enter one end of said chamber, means for directing said gas out of said chamber at a point remote from said one end, means for preventing said gas from directly entering said other chamber, said means comprising a plug closing one end of said other tube, resistance means disposed in each of said chambers and having the characteristics of a high negative temperature coefficient of electrical resistance, means for exposing said resistance means in said one chamber to said entering gas, means for exposing said resistance means in said other chamber to ambient conditions, means electrically connected to each of said resistance means for comparing the electrical resistivity of said resistance means and indicating the difference in resistance.

References Cited

UNITED STATES PATENTS

| 2,731,826 | 1/1956 | Wiley | 73—40.5 |
| 3,132,506 | 5/1964 | Pritchett | 73—40.5 |
| 3,187,558 | 6/1965 | Koncen | 73—40.5 |

DAVID SCHONBERG, *Primary Examiner.*

LOUIS R. PRINCE, *Examiner.*

JEFFREY NOLTON, *Assistant Examiner.*